(12) United States Patent
Roa-Espinosa

(10) Patent No.: US 9,516,891 B1
(45) Date of Patent: Dec. 13, 2016

(54) SEPARATION OF BIOCOMPONENTS FROM WHOLE STILLAGE

(71) Applicant: Aicardo Roa-Espinosa, Madison, WI (US)

(72) Inventor: Aicardo Roa-Espinosa, Madison, WI (US)

( * ) Notice: Subject to any disclaimer, the term of this patent is extended or adjusted under 35 U.S.C. 154(b) by 0 days.

(21) Appl. No.: 15/155,037

(22) Filed: May 15, 2016

(51) Int. Cl.
| | | |
|---|---|---|
| C02F 1/24 | (2006.01) |
| C02F 9/00 | (2006.01) |
| A23J 3/34 | (2006.01) |
| B01D 33/00 | (2006.01) |
| B01D 33/27 | (2006.01) |
| B01D 21/01 | (2006.01) |
| B01D 21/00 | (2006.01) |
| C02F 1/00 | (2006.01) |
| C02F 1/02 | (2006.01) |
| C11B 1/06 | (2006.01) |
| B04B 1/00 | (2006.01) |

(52) U.S. Cl.
CPC ............... *A23J 3/346* (2013.01); *A23K 10/38* (2016.05); *B01D 21/0084* (2013.01); *B01D 21/01* (2013.01); *B01D 33/0041* (2013.01); *B01D 33/27* (2013.01); *C02F 1/00* (2013.01); *C02F 1/02* (2013.01); *C02F 1/24* (2013.01); *C02F 9/00* (2013.01); *C11B 1/06* (2013.01); *B04B 1/00* (2013.01); *Y02E 50/17* (2013.01)

(58) Field of Classification Search
None
See application file for complete search history.

(56) References Cited

U.S. PATENT DOCUMENTS

| | | | |
|---|---|---|---|
| 7,641,928 B2 * | 1/2010 | Jump ..................... | A23K 10/38 210/632 |
| 9,290,728 B2 * | 3/2016 | Bootsma ................. | C11B 1/00 |
| 2015/0001160 A1 * | 1/2015 | Roa-Espinosa ........... | C12F 3/10 210/705 |

FOREIGN PATENT DOCUMENTS

WO WO2012/145230 * 10/2012

* cited by examiner

*Primary Examiner* — Thomas M Lithgow
(74) *Attorney, Agent, or Firm* — Steven H Greenfield; Greenfield Invention and Patent Consulting, Inc.

(57) ABSTRACT

A multi stage process for separating oil, protein, fiber and clean water from a stream containing whole stillage byproduct from ethanol production is disclosed. In a first step, fibers are separated in a two-step process that includes a plate separator and a press. In a subsequent step, the liquid stream separated from the fibers and contains oil, protein and water is treated with a composition that causes the protein to gel. The liquid stream is then processed in a phase separator that drains the oil by gravity, removes the water by an impeller under pressure and removes the solidified protein using a scroll.

13 Claims, 2 Drawing Sheets

SEPARATION OF BIOCOMPONENTS FROM WHOLE STILLAGE

FIELD OF THE INVENTION

The present invention relates to a process of recovering useful bio-components from useful and high value materials that are byproducts resulting from ethanol manufacturing processes. More specifically, the process of the present invention separates a whole stillage stream that is a by-product of ethanol production into four streams: a stream containing predominantly oil, a stream that contains predominantly water, a stream containing predominantly fibers and a stream containing predominantly protein.

BACKGROUND OF THE INVENTION

The ethanol manufacturing process starts by the cleaning and then the dry-milling of maize grains. The ground grains are mixed with water and enzymes (amylases) to produce a mash where starch hydrolysis occurs. This mash is cooked to kill bacteria that produce undesirable lactic acid. Enzymes are added to the mash to transform starch into dextrose (a saccharification step). After saccharification, yeast is added to start the fermentation process, which produces a "beer" and $CO_2$. The beer passes through a continuous distillation column to yield alcohol at the top of the column. The product that remains at the bottom is whole stillage, which in current practice is separated to produce distillers corn oil and distillers' grains. Both byproducts are used as energy and protein sources for ruminants and the distillers corn oil can be used a feed stock for biodiesel production. This invention allows the separation of whole stillage into additional streams contain valuable bio-materials mainly fibers, oil and protein. Greater volumes of oil are recovered for use as a biofuel, animal energy source or for cooking. The ability to separate more DCO creates significant carbon reduction when it is converted to biodiesel rather than being used as an animal feed.

The protein recovered from this invention is in a more concentrated form which increases its value as a protein source for both monogastric and ruminant animals. In addition the main protein in corn is Zein which has been used in the manufacture of a wide variety of commercial products, including coatings for paper cups, soda bottle cap linings, clothing fabric, buttons, adhesives, coatings and binders, recently this protein has been used as a coating for candy, nuts, fruit, pills, and other encapsulated foods and drugs. Additionally Zein can be further processed into resins and other bioplastic polymers.

The fibers recovered from the process of the present invention comprise mostly corn kernel fibers which can be used as raw materials for the production of lignocellulosic ethanol or butanol as well as other chemicals that use glucose and xylose as building blocks.

The present invention results in a significant reduction in energy needed for the grain ethanol co-product separation process and in reduction in the carbon intensity associated with production of grain based ethanol.

SUMMARY OF THE PRESENT INVENTION

It is the object of the present invention to separate a stream of whole stillage materials from ethanol production into a stream rich in fibers, a stream rich in oil, a stream rich in protein and fibers and a stream consisting of clean water that may be recycled in this process or used for various industrial purposes.

In an aspect of the present invention, a multi-stage continuous process for separating a source stream that intermixedly contains water, fibers, protein and oil, the process being configured for separating the source stream into four streams each containing predominantly one component, the source stream containing whole stillage from ethanol production, the process comprising the stages of: providing a first stream comprising whole stillage, the whole stillage containing water, oil, protein and fibers; separating from the first stream a sixth stream having a dry material component containing predominantly fibers and a fourth stream having a dry material component containing predominantly oil and protein; and separating the fourth stream into an eighth stream having a dry matter component containing predominantly oil, a ninth stream predominantly containing water and a tenth stream having a dry matter component containing predominantly protein.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The first embodiment of the present invention includes the steps of:

1. Separating the whole stillage source stream containing water, fibers, non-aqueous liquids such as oil and protein into A) a stream containing predominantly water with between about 4%-10% non-aqueous solids that include protein, oil and fibers and B) a stream containing between 30-45% non-aqueous materials made of mostly fibers, and 2. Treating the stream containing predominantly water and 4-10% non-aqueous solids with a composition that causes the protein to gel.

3. Separating the treated stream containing predominantly water with 4-10% non-aqueous solids into a stream containing predominantly water, a stream containing predominantly oil and a stream relatively rich in protein.

Figure 1:
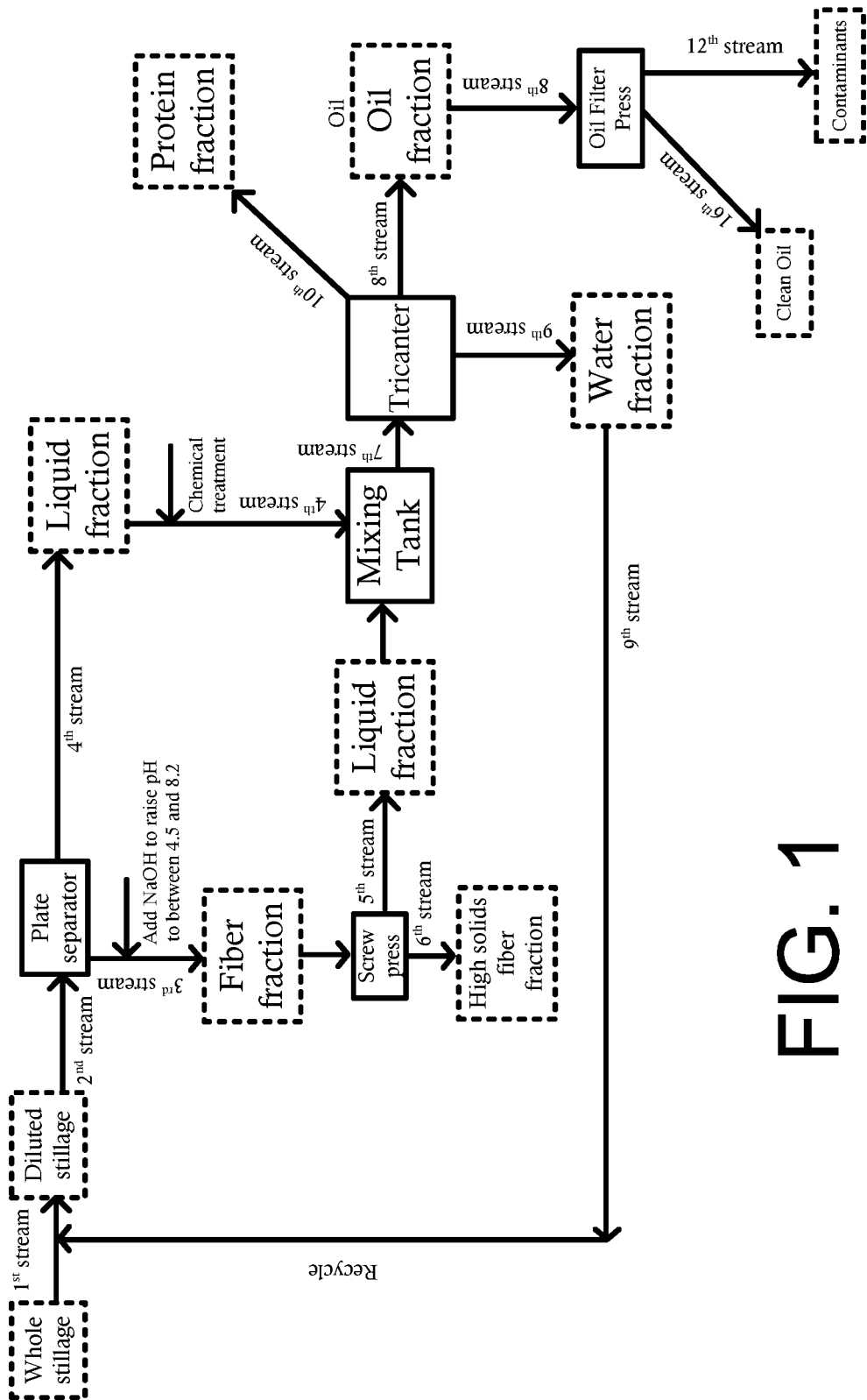
FIG. 1 is a flow chart schematic of the process according to an embodiment of the present invention.

FIG. 1 presents a flow chart of the first process embodiment. Each stream contains water and non-aqueous materials, also referred to as dry matter which can be solids or liquids. In this context, fibers are solid materials, while proteins and oil in their original form are non-aqueous liquids. Protein that is treated with a gelling composition generally turns into a thickened liquid or a solid.

The source stream labeled as the $1^{st}$ stream contains whole stillage from ethanol production and has dry matter in the range of about 10-20%. The $1^{st}$ stream is diluted with recycle water from the downstream process to about 6-10% solids. The diluted whole stillage, labeled as the $2^{nd}$ stream, is passed into a liquid-solid separator that separates the $2^{nd}$ stream into a 3$^{rd}$ stream and a 4$^{th}$ stream. The 3$^{rd}$ stream has a higher concentration of non-aqueous materials than the 1$^{st}$ stream while the 4$^{th}$ stream has a lower concentration of non-aqueous materials than the 1$^{st}$ stream. A liquid-solid separator suitable for this application is an oval plate separator which functions to concentrate solids by passing them between rotating oval plates. An example of an oval plate separator currently being marketed commercially in the US is Trident KDS. However; other separators also fall within the scope of the present invention.

The 3$^{rd}$ stream is passed through a press to separate it into a 5$^{th}$ stream and into a 6$^{th}$ stream. In the 6$^{th}$ stream, the dry matter is further concentrated to contain between about 30% to about 45% dry matter, while in the 5$^{th}$ stream, the dry matter is only in the range of about 7% to about 12% so it is significantly more dilute. The press maybe a screw press or another similar type of press suitable for this purpose.

While dilute, the 4$^{th}$ and 5$^{th}$ streams contain significant amounts of dry materials that need to be recovered. The 4$^{th}$ and 5$^{th}$ streams are combined to form a 7$^{th}$ stream which is passed through a phase separator. The 4$^{th}$ stream is chemically treated with at least one composition that causes the protein to gel around the solid fibers to form a generally solid or semi-solid phase. Chemical compositions suitable as treatment chemicals for the 4$^{th}$ stream include polyamine and tannin. Addition levels may be between about 5 ppm to about 25 ppm based on a % dry composition of the stream. The gelling composition may be added in the 4$^{th}$ stream line or added into the mixing tank where the 4$^{th}$ and 5$^{th}$ streams are combined. In an embodiment of the present invention, the 7$^{th}$ stream is heated to between about 150° F. to about 250° F. and, more preferably, to between about 200° F. to about 210° F. The heating may be accomplished by using a heat exchanger or by direct injection of steam into the stream. Heating the 7$^{th}$ stream enhances the separation of the phases in the phase separator.

The phase separator is configured to separate three immiscible, but intermixed phases that contain a relatively low density liquid phase, a higher density liquid phase and a solid phase. The low density component in the 7$^{th}$ stream is corn oil having a density of about 7.6 lb./gal. Water has a higher density at about 8.3 lb./gal. The gelled protein has a density of between about 10 to about 13 lb./gal.

A suitable phase separator to achieve the separation is a tricanter in which the contents of the stream are fed into a chamber under pressure. An impeller causes the heavy liquid to discharge at the top of the tricanter under pressure, the light liquid is discharged by gravity and a scroll carries the solids out from the liquid phases through a narrow discharge channel that allows passage of small solid particles and fragments.

The separated streams from the phase separator are the 8$^{th}$ stream that contains over 95% oil, the 9$^{th}$ stream that contains over 90% water and the 10$^{th}$ stream that has a dry matter content of between 20 and 37% and is relatively rich in protein and fibers. Part of the 9$^{th}$ stream may be used as dilution water for the whole stillage to form the 2$^{nd}$ stream. The 8$^{th}$ stream may be further passed through an oil filter to remove impurities from it. A suitable tricanter for this purpose is the Flottweg® tricanter that is currently available in the marketplace.

Table 1 below provides composition ranges for the streams of the first embodiment process.

TABLE 1

First embodiment of the process

| Stream | Description | % Dry materials | % Protein | % Oil | % Fibers | Density, lb./gal |
|---|---|---|---|---|---|---|
| 1 | Whole stillage | 10-20 | 2-5 | 1-4 | 2-5 | 8.3 |
| 2 | Diluted stillage | 6-10 | 1-3 | 0.5-1.5 | 1-3 | 8.3 |
| 3 | Plate separator fiber fraction | 12-22 | 3-8 | 1-3 | 5-10 | 8.6 |
| 4 | Plate separator liquid fraction | 5-10 | 1-3 | 0.5-2.5 | <0.1 | 8.1 |
| 5 | Screw press liquid fraction | 7-12 | 1-3 | 0.5-2.5 | <0.1 | 8.1 |
| 6 | Screw press solid fraction | 30-45 | 8-14 | 2-4 | 20-25 | 9.0 |
| 7 | Tricanter feed | 4-8 | 1-2 | 0.5-1.5 | <0.1 | 8.1 |
| 8 | Tricanter oil fraction | 90-99 | 2-5 | 85-95 | 0.1-0.5 | 7.6 |
| 9 | Tricanter water fraction | 2-9 | 0.5-2 | 0.5-2 | <0.1 | 8.1 |
| 10 | Tricanter protein fraction | 20-37 | 10-17 | 2-6 | 5-14 | 10-13 |
| 11 | Filtered oil | 95-99 | 2-4 | 92-96 | <0.1 | 7.6 |

A screen analysis of the fibers present in the whole stillage (Stream 1) indicates that about 90% of the fibers are larger than 1.2 mm as they pass through a screen opening of about 1.2 mm.

Figure 2:
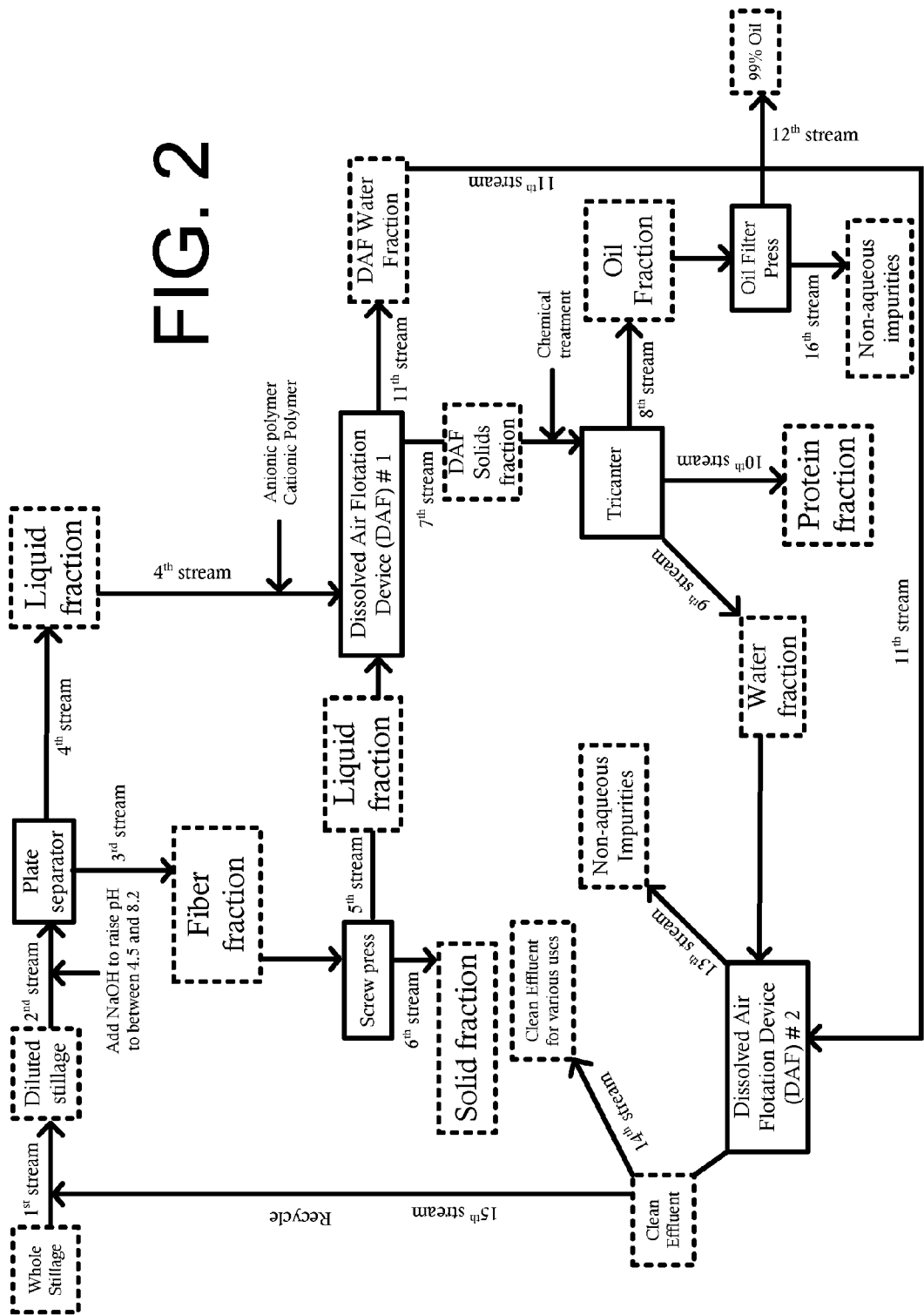
FIG. 2 is a flow chart schematic of the process according to another embodiment of the present invention.

The second embodiment of the present invention process is shown in FIG. 2. A dissolved air flotation device (DAF) is used to remove water from the 4$^{th}$ stream prior to the separation in the tricanter. This allows for easier control over the process resulting in better consistency and reduced variability of the stream compositions. With the process configuration shown in FIG. 2, the 4$^{th}$ and 5$^{th}$ streams are fed into the DAF that separates out an 11$^{th}$ stream that contains low dry matter and an 7$^{th}$ stream that contains most of the solids from the 4$^{th}$ and 5$^{th}$ streams. The 7$^{th}$ stream is fed into the tricanter which splits it into three phases as with the first embodiment. The water from the tricanter in the 9$^{th}$ stream may be combined with the water fraction from the DAF in the 11$^{th}$ stream. The combination stream may further be passed through a second DAF which removes additional dry matter from the water fraction. A portion of the water fraction from the second DAF may be recycled to be used as dilution water for the whole stillage or for water to be used in the ethanol process. Reduction of the water content from the combined the 4$^{th}$ and 5$^{th}$ streams using the dissolved air flotation device (DAF) prior to feeding the combined the 4$^{th}$ and 5$^{th}$ streams into the tricanter improves the operating efficiency of the tricanter.

As with the first embodiment, the 7$^{th}$ stream entering into the phase separator is treated to cause the protein to gel around the fibers. This increases the density of the protein from about 9.0 lb./gal to between about 10 and 13 lb./gal. In this form, the protein is substantially a solid and may be effectively separated out by the phase separator.

Table 2 below provides the compositions of the streams for the second embodiment of the process.

TABLE 2

Second embodiment of the process

| Stream | Description | % Dry materials | % Protein | % Oil | % Fibers | Density, lb/gal |
|---|---|---|---|---|---|---|
| 1 | Whole stillage | 10-20 | 2-5 | 1-4 | 2-5 | 8.3 |
| 2 | Diluted stillage | 6-10 | 1-3 | 0.5-1.5 | 1-3 | 8.1 |
| 3 | Plate separator fiber fraction | 12-22 | 3-8 | 1-3 | 5-10 | 8.6 |
| 4 | Plate separator liquid fraction | 5-10 | 1-3 | 0.5-2.5 | <0.1 | 8.1 |
| 5 | Screw press liquid fraction | 7-12 | 1-3 | 0.5-2.5 | <0.1 | 8.1 |
| 6 | Screw press solid fraction | 30-45 | 8-14 | 2-4 | 20-25 | 9.0 |
| 7 | DAF solids fraction | 9-14 | 2-5 | 2-5 | 1-3 | 8.5 |
| 8 | Tricanter oil fraction | 95-99.9 | <0.1 | 95-99.9 | <0.1 | 7.6 |
| 9 | Tricanter water fraction | 2-4 | 0.5-1.5 | 0.5-1.5 | <0.1 | 8.1 |
| 10 | Tricanter protein fraction | 25-30 | 11-15 | 2-4 | 7-11 | 10-13 |
| 11 | DAF water fraction | 2-7 | 0.5-2 | 0.1-0.5 | <0.1 | 8.1 |
| 15 | Recycle water | 1-3 | 0.5-1 | 0.5-1 | <0.1 | 8.1 |

The 4$^{th}$ and 5$^{th}$ streams are mixed before entering the first DAF and are treated with:

1. between about 5 ppm to about 100 ppm on a dry weight basis of an anionic acrylamide copolymer such as sodium or potassium acrylate acrylamide copolymer having a charge density of about 50% and a MW of between 18 million and 24 million, and 2. between about 5 ppm to about 100 ppm on a dry weight basis of an cationic acrylamide copolymer such as Acrylamide-dimethylaminoethyl acrylate copolymer (ADMAEA) having a Molecular Weight of between 8 million to 12 million and a charge density between about 20-40%.

The polymers are added in line at two addition points separated by 15 seconds calculated based on an average volumetric flow rate through the line. The anionic acrylamide copolymer is preferably added first. The additions of these polymers aids in the separation of the 4$^{th}$ and 5$^{th}$ streams that are fed into the DAF into the 7$^{th}$ and 11$^{th}$ streams. The 7$^{th}$ stream floats to the top of the first DAF and is removed as an overflow.

The 8$^{th}$ stream containing over 95% oil in both the first and second embodiments may further be passed through an oil filter to remove impurities.

Below is information about the compositions and properties of the treatment chemicals added in the processes of the present invention:

Polyamines
  Molecular weight between 10,000 and 1,000,000
  Liquid form with 40 to 50% concentration
  Cationic site on the main chain
  Viscosity at 50% of between 40 and 20,000 centipoises.

Tannin
  Molecular weight between 10,000 and 300,000
  Liquid form with 30 to 40% concentration
  Cationic site on the main chain
  Viscosity at 50% of between 40 and 2000 centipoises
  Comes in various forms such as tannic acid $C_{17}H_{16}O_9$ and gallic acid $C_7H_6O_5$.

ADMAEA
  Acrylamide-dimethylaminoethyl acrylate copolymers.
  The copolymerization of DMAEA-MeCl with acrylamide produces the cationic polymer.
  The main characteristics of the products obtained are:
    Molecular weight: about 3 million to about 10 million.
  Viscosity at 5 g/l: 100 to 1700 cps.
  Specifically: acrylamide/Ethanaminium, N, N, N-trimethyl-2-(1-oxo-2-propenyl)oxo)-, chloride copolymer is a useful form of ADMAEA in the present invention.

The molecular formula is $C_{11}H_{21}ClN_2O_3$. The molecular structure is shown below in 2D.

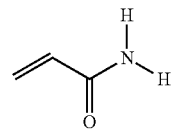

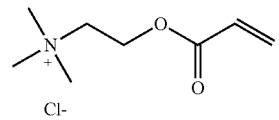

Cationic Acrylamide Copolymers

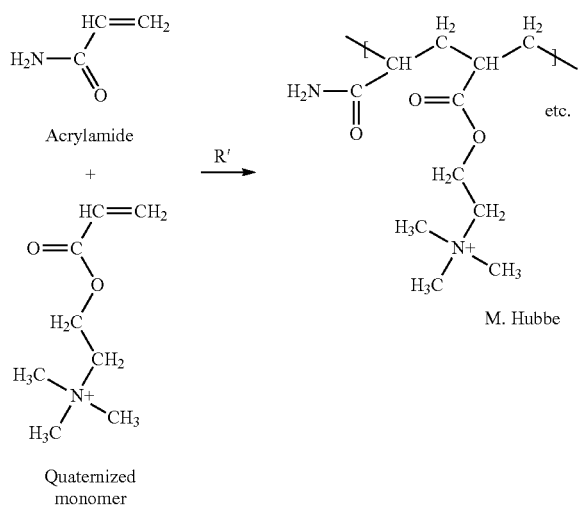

Sodium or Potassium Anionic Acrylate Acrylamide Copolymer.

This polymer may be made from the reaction between an acrylamide monomer and an acrylic acid monomer as shown below.

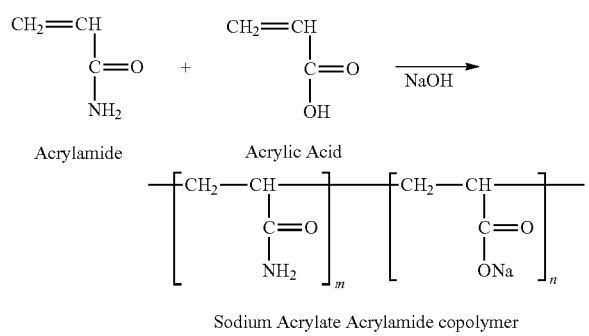

Sodium Acrylate Acrylamide copolymer

It is noted that in the context of the present invention, a dry matter component is defined as predominant in a given stream if it is present at a higher percent than any of the other dry matter component in the stream.

It should be understood, of course, that the foregoing relates to exemplary embodiments of the invention and that modifications may be made without departing from the spirit and scope of the invention.

I claim:

1. A multi-stage process for separating a source stream, said source stream containing oil water, fibers and protein, said process being configured for separating the source stream into four streams, wherein each stream contains predominantly one component, said process comprising the stages of:
   providing a first stream comprising whole stillage, said whole stillage containing water, oil, protein and fibers;
   separating from the first stream a sixth stream having a dry matter component containing predominantly fibers and a fourth stream having a dry component containing predominantly oil and protein; and
   separating the fourth stream into an eighth stream having a dry matter component containing predominantly oil, a ninth stream containing predominantly water and a tenth stream having a dry component containing predominantly protein,
   wherein separating the fourth stream is accomplished by a tricanter in which a liquid oil phase drains by gravity, a liquid water phase is discharged at a top of the tricanter under pressure by an impeller and a solid protein phase being moved by a scroll out a discharge opening, and
   wherein separating the sixth stream from the first stream is accomplished through the steps of: adding dilution water to the first stream to produce a second stream containing dilute whole stillage; adding to the second stream a caustic solution such that a pH of the second stream is raised to between about 4.5 to about 8.2; passing the second stream through an oval plate separator, wherein actions of the oval plate separator resulting in separating the second stream into a third stream and into the fourth stream, wherein a dry matter of the third stream comprises predominantly fibers; and passing the third stream through a press, wherein actions of the press result in separating the third stream into a fifth stream and into the sixth stream, said fifth stream having a dry matter component containing predominantly oil and protein.

2. The process of claim 1, wherein separating the fourth stream comprises a step of treating the fourth stream with a chemical composition to cause the protein to solidify, said chemical composition being added to the fourth stream at a rate of between about 5 ppm to about 25 ppm based on dry weight.

3. The process of claim 2 wherein said composition is selected from the group consisting of polyamine and tannin.

4. The process of claim 1 further comprising returning at least a portion of the ninth stream as dilution water to the first stream to form a dilute whole stillage stream.

5. The process of claim 1, further comprising combining the fifth stream and the fourth stream before feeding the fourth stream into the phase separator.

6. The process of claim 1 further comprising passing the eighth stream through an oil press to remove impurities.

7. A multi-stage process for separating a source stream, said source stream containing oil water, fibers and protein, said process being configured for separating the source stream into four streams, wherein each stream contains predominantly one component, said process comprising the stages of:
   providing a first stream comprising whole stillage, said whole stillage containing water, oil, protein and fibers;
   separating from the first stream a sixth stream having a dry matter component containing predominantly fibers and a fourth stream having a dry component containing predominantly oil and protein; and
   separating the fourth stream into an eighth stream having a dry matter component containing predominantly oil, a ninth stream containing predominantly water and a tenth stream having a dry component containing predominantly protein, wherein separating the fourth stream into an eighth stream, a ninth stream and a tenth stream is accomplished by the steps of: treating the fourth stream with between about 5 to about 100 ppm on a dry weight basis of an anionic acrylamide copolymer, said treating being done through an addition at a first in-line inlet port; treating the fourth stream with between about 5 to about 25 ppm on a dry weight basis of a cationic acrylamide copolymer, said treating being done through an addition at a second in-line inlet port, said second in-line inlet port being located at about 15 seconds after the first in-line inlet port based on an average volumetric flow rate; passing the fourth stream through a dissolved air flotation device wherein the actions of the dissolved air flotation device result in separating the fourth stream into a seventh stream and an eleventh stream, said seventh stream having a dry component containing predominantly oil and protein, said eleventh stream containing predominantly water; treating the seventh stream with a chemical composition to cause the protein to solidify; and passing said seventh stream through a phase separator configured to separate a low density liquid phase, a higher density liquid phase and a solid phase.

8. The process of claim 7 wherein the phase separator separates the seventh stream into an eighth stream having a dry matter component containing predominantly oil, a ninth stream that contains predominantly water and a tenth stream whose dry component is predominantly protein.

9. The process of claim 8 further comprising passing the eighth stream through an oil press to remove impurities.

10. The process of claim 7 wherein the phase separator is a tricanter in which a liquid oil phase drains by gravity, a liquid water phase is discharged at a top of the tricanter under pressure by an impeller and a solid protein phase being moved by a scroll out a discharge opening.

11. The process of claim 7, further comprising feeding the ninth and eleventh streams into a dissolved air flotation device to further separate out solid impurities and produce a fourteenth stream that contains useable water.

12. The process of claim 7, further comprising heating the seventh stream to between about 150° F. to about 250° F.

13. The process of claim 12, further comprising heating the seventh stream to between about 200° F. to about 210° F.

* * * * *